455-296 SR
FIP8106 XR 3,046,395
July 24, 1962 E. OGER 3,046,395
CARRIER WAVE CHANGING SYSTEMS
Filed May 21, 1959
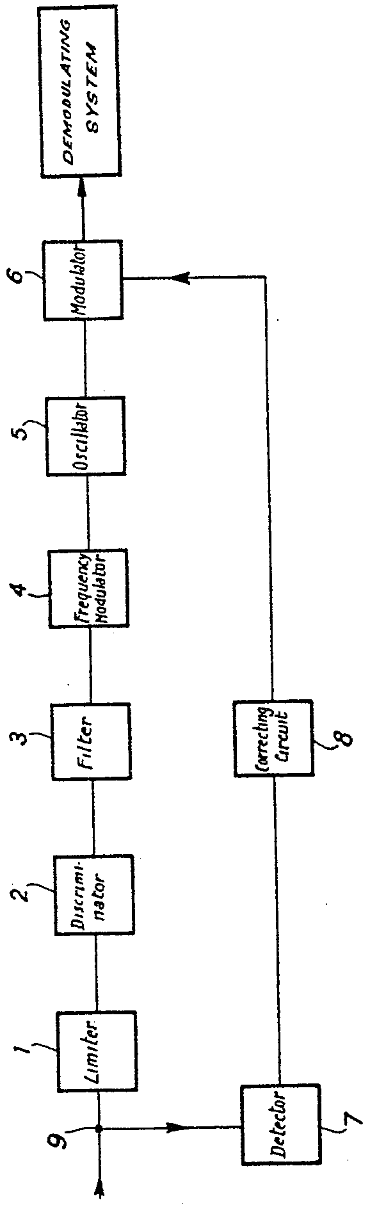
2 path, lim in one

1

3,046,395

CARRIER WAVE CHANGING SYSTEMS

Eugène Oger, Paris, France, assignor to Compagnie Generale de Telegraphie Sans Fil, a corporation of France Filed May 21, 1959, Ser. No. 814,910
Claims priority, application France June 5, 1958
4 Claims. (Cl. 325—430)

The present invention relates to transmission systems where it is desired to substitute one carrier frequency for another.

More particularly the invention relates to transmission systems wherein a single side band is transmitted and the carrier is suppressed.

Generally, in such systems the carrier is reinserted at the reception end, which requires that its frequency should be accurately known. If the maximum frequency shift is not to be greater than 50 c./s., a stability of $5.10^{-7}$ is to be obtained with a pilot carrier of 50 mc./s. Now, for example in the aviation technique, at a speed of 500 km./h. and at 50 mc./s., the Doppler effect on the carrier frequency is of the order of 50 c./s., while a stability up to 3 c./s. has been considered sometimes as desirable.

To obtain such a precision, bulky and costly equipment is necessary and it is an object of the present invention to avoid the use of such an equipment. More precisely, it is an object of the present invention to avoid the necessity of restoring the original carrier wave during the reception.

A receiver system, according to the invention comprises two channels arranged in parallel, the first channel including in series an amplitude limiter, a frequency discriminator, a high-pass filter and a frequency modulated oscillator, the second channel comprising a detector, means being provided for amplitude modulating said oscillator output by said detector output.

The invention will be best understood from the following description and appended drawing the single FIGURE of which diagrammatically illustrates a receiver system according to the invention.

The receiver system shown comprises two channels in parallel. A first channel comprises in series a limiter 1, a frequency discriminator 2, a high-pass filter 3, a frequency modulator 4 modulating an oscillator 5 and an amplitude modulator 6. The second channel connected between input 9 of limiter 1 and modulator 6 comprises an amplitude detector 7 and a corrector network 8.

The device shown in the FIGURE operates as follows, the transmitted intelligence being for the sake of convenience, expressed in the following form:

$$V_1 = a(t) \cos \varphi(t) \qquad (1)$$

where $a(t)$ is the amplitude and $\varphi(t)$ the phase of the intelligence signal.

Upon modulation in a single side band suppressed carrier type transmitter, the above signal may be written as follows:

$$V_2 = a(t) \cos [\omega t + \varphi(t)] \qquad (2)$$

where $\omega$ is the angular speed of the carrier. The value of this frequency, which is constant, is not known at the receiving end.

This signal is received by the receiver, which, except for the portion thereof diagrammatically shown in the FIGURE, is entirely conventional. At the output of limiter stage 1, the amplitude of the signal is constant and the signal is of the form, $$V_3 = A_1 \cos [\omega t + \varphi(t)] \qquad (3)$$

where $A_1$ is a constant, the amplitude modulation being thus eliminated. This signal is applied to frequency discriminator 2. At the output a signal $$V_4 = k_1\left(\omega + \frac{d\varphi}{dt}\right) \qquad (4)$$

is collected.

2

It is apparent that $V_4$ comprises a constant term $k_1\omega$ which is eliminated by means of high-pass filter 3. At the output of the latter, the following signal is obtained:

$$V_5 = k_1 \cdot \frac{d\varphi}{dt} \qquad (5)$$

This signal is completely independent of the angular speed of the initial carrier. This signal is then applied to an assembly comprising the frequency modulator 4 coupled to the oscillator 5, which is thus frequency modulated. The angular speed of the carrier wave provided by oscillator 5 being $\omega_0$, the resulting frequency modulated signal $V_6$ is of the form:

$$V_6 = A_2 \cos [\omega_0 t + k_1 k_2 \varphi(t)]$$

$A_2$, $k_1$ and $k_2$ are constants which depend only on the characteristics of the elements constituting the various circuits. By selecting these constants in such a manner that $k_1 k_2 = 1$, which condition may be fulfilled rather approximately, the signal at the input of modulator is $$V_6 = A_2 \cos [\omega_0 t + \varphi(t)] \qquad (6)$$

The carrier frequency of this signal is thus entirely different from and independent of the initial carrier frequency.

This carrier is selected by the operator controlling the reception and may be substantially lower than the original carrier, the required stability being thus reduced within the ratio $\omega/\omega_0$.

Signal $V_6$ is then modulated in modulator 6, by the modulating component of signal $V_2$ which is collected at 9 and is detected in amplitude detector 7. A corrector network 8 is inserted between detector 7 and modulator 6, such as a delay line for equalizing the transmission times.

The output signal of modulator 6 is:

$$V_7 = a(t) \cos [\omega_0 t + \varphi(t)] \qquad (7)$$

which is similar to signal $V_2$, except that the carrier wave is different and conventional demodulation thereof provides the intelligence signal.

As may be readily seen what has been done amounts to a translation in the frequency spectrum of an amplitude and phase modulated wave having the form (Eq. 2)

$$a(t) \cos [\omega t + \varphi(t)]$$

Of course this translation may be done on any wave having this form regardless of the origin of the wave and of the signification of $a(t)$ and $\varphi(t)$. In particular the system of the invention may also be used for receiving signals transmitted in independent side band transmission systems. It is also applicable to transmitting systems.

It is to be understood that the invention is in no way limited to the embodiment illustrated and described which is given only by way of example.

What is claimed, is:

1. A system for translating in the frequency spectrum a first, amplitude and phase-modulated, wave having the form $a(t) \cos [\omega t + \varphi(t)]$, said system comprising first means having an input and an output for deriving from said first wave a first signal proportional to $$\frac{d\varphi}{dt}$$

said first means comprising in series an amplitude limiter, a frequency discriminator and a high pass filter, second means having an input and an output for deriving from said first wave a second signal proportional to $a(t)$, means for applying said first wave to the input of said first means and to the input of said second means, a frequency modulating assembly coupled to the output of said first means and comprising oscillator means and frequency modulator means for providing a second wave frequency modulated by said first signal, and means coupled to the output of said frequency modulating assembly and to the output of said second means for amplitude modulating said second wave by said second signal.

2. A system for translating in the frequency spectrum an initial amplitude and phase modulated wave having the form $a(t)\cos[\omega t+\varphi(t)]$, said system comprising first means having an input and an output for deriving from said initial wave a first signal proportional to $$\frac{d\varphi}{dt}$$

said first means comprising in series an amplitude limiter, a frequency discriminator and a high pass filter; second means having an input and an output for deriving from said initial wave a second signal proportional to $a(t)$, means for applying said initial wave in parallel to the input of said first means and to the input of said second means, and means coupled to the output of said first means and to the output of said second means for producing a second wave frequency modulated by said first signal and amplitude modulated by said second signal.

3. A system for translating in the frequency spectrum an amplitude and phase-modulated wave comprising: a first channel, having an input and an output, comprising in series an amplitude limiter, a frequency discriminator, a high pass filter, a frequency modulating assembly comprising an oscillator and a frequency modulator; a second channel, having an input and an output, comprising a detector and a corrector network; means for applying said amplitude and phase modulated wave in parallel to the inputs of said first and second channels; and an amplitude modulator coupled to the outputs of said first and second channels.

4. A system for demodulating an initial amplitude and phase modulated wave having the form $$a(t)\cos[\omega t+\varphi(t)]$$

comprising a first channel, having an input and an output, comprising in series an amplitude limiter, a frequency discriminator, a high pass filter and a frequency modulating assembly comprising an oscillator and a frequency modulator; a second channel having an input and an output, comprising a detector; means for applying said initial amplitude and phase modulated wave in parallel to the inputs of said first and second channels; an amplitude modulator having two inputs respectively coupled to the outputs of said first and second channels, and an output, for supplying a second amplitude and phase modulated wave having the form $a(t)\cos[\omega_0 t+\varphi(t)]$ where $\omega_0$ is a constant independent of $\omega$; and demodulating means coupled to the output of said amplitude modulator for demodulating said second amplitude and phase modulated wave.

References Cited in the file of this patent

UNITED STATES PATENTS

| | | |
|---|---|---|
| 2,784,311 | Kahn | Mar. 5, 1957 |
| 2,793,349 | Crosby | May 21, 1957 |
| 2,828,412 | Jager | Mar. 25, 1958 |
| 2,874,222 | De Jager | Feb. 17, 1959 |
| 2,907,831 | Jager | Oct. 6, 1959 |